Aug. 6, 1963   E. V. GARNETT   3,100,049
OUTRIGGERS FOR VEHICLES
Original Filed April 28, 1958   2 Sheets-Sheet 1

INVENTOR.
EDWARD V. GARNETT
BY
Horace B. Van Valkenburgh
ATTORNEY

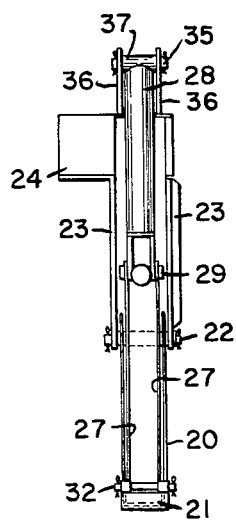
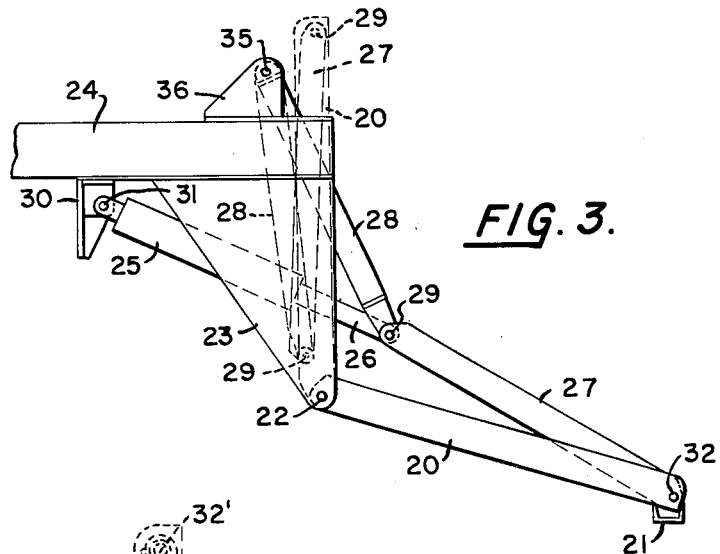
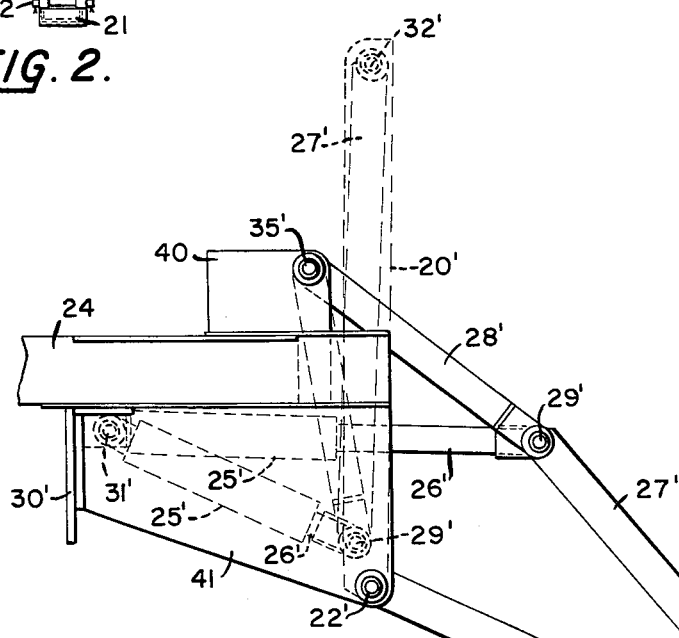

United States Patent Office 3,100,049
Patented Aug. 6, 1963

3,100,049
OUTRIGGERS FOR VEHICLES
Edward V. Garnett, 3963 Walnut St., Denver, Colo.
Original application Apr. 28, 1958, Ser. No. 731,485, now Patent No. 3,056,510, dated Oct. 2, 1962. Divided and this application Aug. 22, 1961, Ser. No. 133,117
6 Claims. (Cl. 212—145)

This invention relates to outriggers, and more particularly to outriggers for vehicles, such as trucks utilizing derricks or the like. This application is a division of my copending application Ser. No. 731,485, filed April 28, 1958, and entitled "Derrick for Vehicles," now U.S. Patent No. 3,056,510.

Among the objects of this invention are to provide an outrigger which is particularly adapted for use on a vehicle carrying a derrick or the like; to provide such an outrigger which will prevent the vehicle from tipping over when the derrick is extended, such as horizontally to full position, on either side of the vehicle; to provide such an outrigger which positively supports the superstructure of the derrick from the ground; and to provide such an outrigger which may be folded to a compact storage position, out of the way of other parts.

Additional objects and the novel features of this invention will become apparent from the description which follows, taken in conjunction with the accompanying drawings, in which:

FIG. 2 is an enlarged end elevation of an outrigger of FIG. 1 in extended position;

FIG. 3 is a fragmentary side elevation of the outrigger of FIG. 2 in extended position and certain associated parts, the retracted position of the outrigger being shown in dotted lines; and FIG. 4 is an enlarged fragmentary side elevation similar to FIG. 3, showing a modified outrigger in a further extended position and an alternative supporting assembly.

Figure 1:
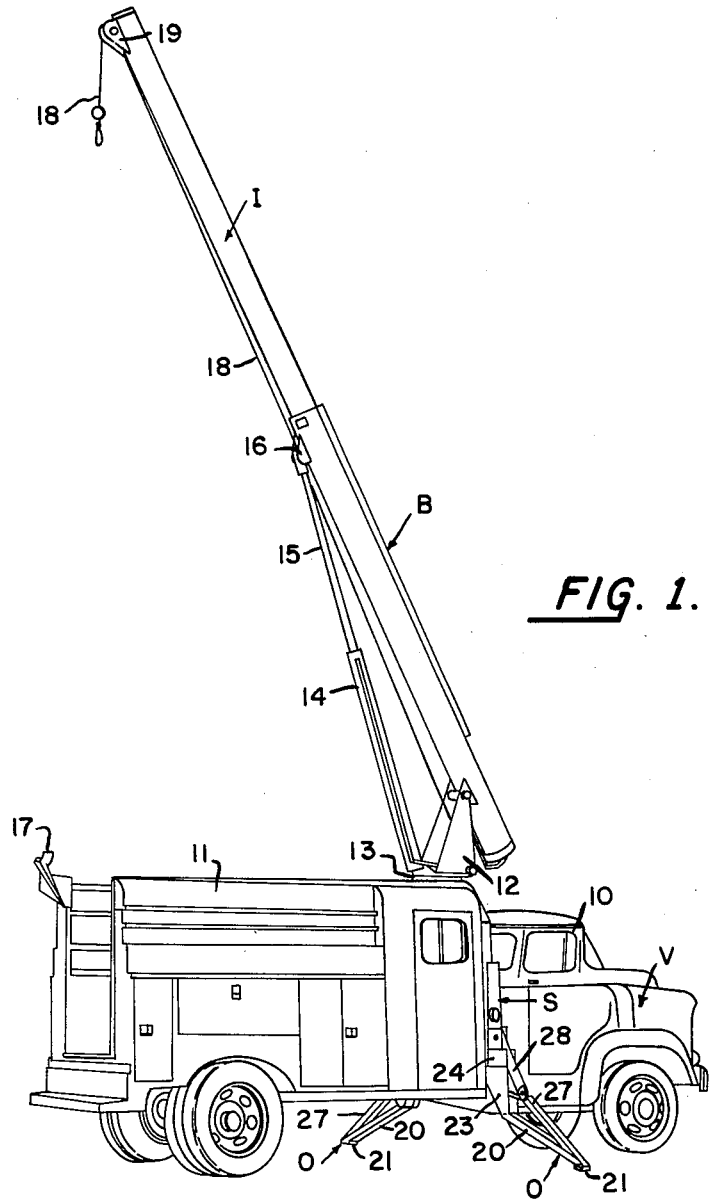
FIG. 1 is a perspective view, taken from a point rearwardly and to one side of a truck, showing a derrick with its boom in extended position, and the outriggers in supporting position on either side of the truck.

As illustrated in FIG. 1, a derrick may be mounted on a vehicle V, such as a panel type truck as shown, having a cab 10 and a panel body 11. The derrick may include a boom B which is pivotally attached to a bracket lever 12, which in turn is pivotally mounted on a turntable 13, which is supported by a superstructure S. At each side, the superstructure S may be provided with an outrigger O, adapted to be extended downwardly and outwardly at each side from the lower portion of the superstructure S, so as to provide lateral support for the vehicle, particularly in the event that the load is being handled at one side or the other thereof. The outer boom B may encompass an inner boom I, which is adapted to be extended by hydraulic means, such as shown and described in my aforesaid application Ser. No. 731,485. The outer boom B may be raised and lowered to any desired angular position by a hydraulic cylinder 14, pivotally mounted at its inner end on turntable T, and having a piston rod 15 which is pivotally connected to a bracket 16 mounted on the underside of boom B adjacent the outer end thereof. The operation of the bracket lever 12, in raising the boom B to the position shown in FIG. 1 from a storage position in which the outer end of the boom rests on a support 17 mounted at one side of the panel body 11, is more fully explained in my aforesaid application Ser. No. 731,485. As will be evident, the boom B may be moved from a lower position and may be extended to the extent shown in FIG. 1, or to any intermediate position between the retracted and fully extended positions. The derrick may also be provided with a hoisting cable 18 which passes over a sheave mounted in a bracket 19 at the outer end of the inner boom as well as a sheave mounted in bracket 17, and thence to the center of turntable 13, the cable 18 passing between the two sides of the bracket lever 12 and thence to a winch mounted in the superstructure S.

In accordance with this invention, as in FIGS. 2 and 3, each outrigger O may include an arm 20, such as formed by a channel, provided at its outer end with a pad 21, adapted to engage the ground when the outrigger is in the down position shown in FIG. 1. The inner end of the arm 20 may be pivoted on a pin 22 extending between a pair of brackets 23, depending from a base 24 of the superstructure S. Each respective outrigger may be actuated by a hydraulic cylinder 25 provided with a piston rod 26, the outer end of the piston rod 26 being pivotally connected to both the inner end of a lower link 27 and the outer end of an upper link 28, as by a pin 29. The inner end of cylinder 25 may be pivotally connected to a bracket 30 which depends from base 24 of the superstructure S, as by a pin 31. The lower link 27, which may be a channel having a lesser width than the width between the channel flanges of arm 20 and thereby adapted to fit within the same when in the retracted or dotted position shown in FIGS. 3 and 4, may be pivotally connected at its outer end to the outer end of arm 20 by a pin 32. The upper link 27, which may be tubular but bifurcated at its outer end, may be pivoted at its inner end on a pin 35, extending between the sides of a U-shaped bracket 36 mounted atop base 24 of the superstructure S, the inner end of upper link 28 may be provided with a bearing sleeve 37 surrounding pin 35. Suitable hoses may lead from the superstructure S to the hydraulic cylinder 25 to supply hydraulic fluid to the respective ends of the cylinder. As will be evident from FIG. 1, each outrigger O may be similar but complementary in construction. As will be evident, when piston rod 26 is extended to the position of FIG. 3, the arm 20 will be moved downwardly until pad 21 engages the ground. As will be evident from FIG. 3, arm 20 and also cylinder 25 will resist the forces tending to overturn the vehicle. However, unless the hydraulic fluid in cylinder 25 is maintained at full pressure, there may be a tendency for piston rod 26 to move into cylinder 25 upon the imposition of heavy forces.

By properly proportioning the parts, as by providing lengthened arm 20, link 27', cylinder 25' and piston rod 26', addition extension of piston rod 26' will cause links 27' and 28' to extend in a straight line or to be overthrown past a straight line, as in FIG. 4, so that forces transmitted from the vehicle to the ground will be resisted by the arm 20' and by the links 27' and 28', when in a straight line or nearly in a straight line. When links 27' and 28' are in a straight line, the only force necessary for the hydraulic fluid in cylinder 25' to resist is the component of force tending to buckle the links 27' and 28', which is relatively small. However, when the links 27' and 28' are overthrown past a straight line, the force tending to buckle links 27' and 28' will place piston rod 26' in tension, so that hydraulic fluid pressure in cylinder 25' tending to extend rod 26' need not be maintained at full value. For resisting greater forces, a larger pin 35' may be mounted in a larger or heavier bracket 40 of FIG. 4 and larger pin 22' may be mounted in a larger or heavier bracket 41. Similarly, pin 29', bracket 30' and pins 31' and 32' may be larger or heavier than the corresponding parts of FIG. 3.

In each of FIGS. 3 and 4, when piston rod 26 or 26' is fully retracted, links 27 or 27' and 28 or 28' will form a small acute angle therebetween, with link 27 or 27' being received in arm 20 or 20' and link 28 or 28' being partially received in link 27 or 27' as in the dotted positions shown. Thus, in storage position, each outrigger will be very compact and will not extend laterally beyond the superstructure S. As will be evident, when an outrigger is moved to the down or extended position of FIGS. 3 and 4, pad 21 will engage the ground at a point spaced a sufficient distance laterally from the body of the vehicle that any tendency for the vehicle to overturn, upon the imposition of a heavy load upon the derrick when operating at one side of the vehicle, will be overcome. It will be noted that such vehicles are normally provided with springs, but that the outriggers engage the ground positively and that when both outriggers are down, the superstructure S is supported positively from the ground.

From the foregoing, it will be evident that an outrigger constructed in accordance with this invention fulfills to a marked degree the requirements and objects hereinbefore set forth. The use of the outrigger of this invention will prevent a vehicle carrying a derrick from tipping over when the derrick is extended horizontally to a position on either side of the truck and is fully loaded. Also, by use of the outrigger pivotally mounted on each side of the superstructure, the superstructure may be solidly supported from the ground, at each side of the vehicle, so that comparatively heavy loads may be handled at either side of the vehicle. The outriggers are arranged, by use of channel shaped supporting arms and links, so that they may be folded to a very compact storage position, out of the way of other operating parts of the truck or derrick.

Although a preferred embodiment of this invention has been described and illustrated, it will be understood that other embodiments may exist and various changes and variations made, without departing from the spirit and scope of this invention.

What is claimed is:

1. An outrigger for use with a vehicle mounted derrick comprising an upper link pivotally connected at one end to said vehicle; a lower link; first pivot means connecting the opposite end of said upper link to one end of said lower link; an arm pivotally connected at its inner end to said vehicle; second pivot means connecting the other end of said lower link to the outer end of said arm; and extensible and retractable hydraulic means operatively connected between said vehicle and said first pivot means, said hydraulic means thereby being adapted to move said links to either raise or lower said arm.

2. An outrigger as set forth in claim 1, wherein said arm is provided at its outer end with a pad for engaging the ground.

3. An outrigger as set forth in claim 1, in which said upper link is pivoted to said vehicle at a point spaced upwardly from the inner end of said arm; and said hydraulic means is pivotally connected to said vehicle inwardly from the pivotal connection of each of said upper link and said arm.

4. An outrigger as set forth in claim 1, in which said arm is retractible to a generally vertical position by said hydraulic means; and said arm is channel shaped and has a size such that said lower link will be received in said channel of said arm when said arm is retracted to said generally vertical position.

5. An outrigger as set forth in claim 4, wherein said lower link is also channel shaped and has such a size that said upper link is received in the channel thereof when said arm is raised to said generally vertical position.

6. An outrigger as set forth in claim 1, in which said hydraulic means is extensible to an extent such that said lower links are overthrown past a straight line position when said arm is moved downwardly to engage the ground.

References Cited in the file of this patent

UNITED STATES PATENTS

| | | |
|---|---|---|
| 2,557,484 | Wagner et al. | June 19, 1951 |
| 2,621,811 | Lull | Dec. 16, 1952 |
| 2,663,433 | Le Clair | Dec. 22, 1953 |
| 2,961,102 | Pitman | Nov. 22, 1960 |
| 3,032,914 | McGuire et al. | Mar. 6, 1962 |